United States Patent
Liu et al.

(10) Patent No.: US 7,656,658 B2
(45) Date of Patent: Feb. 2, 2010

(54) MOUNTING APPARATUS FOR DATA STORAGE DEVICE

(75) Inventors: Chang-Chun Liu, Shenzhen (CN); Xiao-Lin Gan, Shenzhen (CN); Yu-Kuang Ho, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 177 days.

(21) Appl. No.: 11/834,026

(22) Filed: Aug. 6, 2007

(65) Prior Publication Data

US 2008/0304227 A1    Dec. 11, 2008

(30) Foreign Application Priority Data

Jun. 7, 2007    (CN)    ......... 2007 1 0200780

(51) Int. Cl.
*G06F 1/16*    (2006.01)
(52) U.S. Cl. .................... 361/679.37; 361/679.35
(58) Field of Classification Search ................
361/679.37–679.39
See application file for complete search history.

(56) References Cited

U.S. PATENT DOCUMENTS

| | | | | |
|---|---|---|---|---|
| 5,806,949 A | * | 9/1998 | Johnson | 312/334.7 |
| 7,180,734 B2 | * | 2/2007 | Jing | 361/679.33 |
| 7,336,482 B2 | * | 2/2008 | Chen et al. | 361/679.33 |
| 7,369,403 B2 | * | 5/2008 | Chen et al. | 361/679.33 |
| 7,382,610 B2 | * | 6/2008 | Lin et al. | 361/679.33 |
| 7,450,375 B2 | * | 11/2008 | Xu | 361/679.33 |
| 7,486,510 B2 | * | 2/2009 | Han et al. | 361/679.33 |
| 7,495,925 B2 | * | 2/2009 | Chen et al. | 361/726 |
| 2007/0164170 A1 | * | 7/2007 | Huang et al. | 248/27.1 |

FOREIGN PATENT DOCUMENTS

CN    2833794 Y    11/2006

\* cited by examiner

*Primary Examiner*—Lisa Lea-Edmonds
(74) *Attorney, Agent, or Firm*—Frank R. Niranjan

(57) ABSTRACT

A mounting apparatus is provided to readily fix a data storage device defining at least one hole in place. The mounting apparatus includes a bracket fastened to a computer enclosure, and the bracket includes a side panel and at least one elastic tab formed at or attached to the side panel corresponding to the hole of the data storage device. The elastic tab includes a fixing portion, for engaging in the hole of the storage device, and an operation portion positioned outside the bracket for manipulating the elastic tab.

10 Claims, 4 Drawing Sheets

MOUNTING APPARATUS FOR DATA STORAGE DEVICE

BACKGROUND

1. Technical Field

The present invention relates to mounting apparatuses and especially to a mounting apparatus for readily fixing or removing a data storage device.

2. General Background

Generally speaking, when a computer is assembled, a bracket is mounted in a computer enclosure, and then data storage devices are fixed to the bracket to enlarge the function of the computer. The data storage devices may include various combinations of hard disk drives (HDDs), floppy disk drives (FDDs), and compact disk-read only memory (CD-ROM) drives.

Conventionally, a storage device is attached to a bracket of a computer by bolts. However, attachment by bolts is tiresome and time-consuming.

To address the aforementioned problem, a mounting apparatus not requiring the use of bolts is invented. The mounting apparatus includes a bracket, a latch member for fixing a storage device in the bracket, and a fastener for fixing the latch member to the outside of the bracket. The latch member includes a plurality of posts extending through the bracket to engage with the storage device. However, it is complicated and time-consuming to manipulate all the components including the latch member and the fastener when using the mounting apparatus.

What is desired, therefore, is a mounting apparatus which allows readily secure installation or removal of a storage device thereto or therefrom.

SUMMARY

An exemplary mounting apparatus for a data storage device includes a bracket fastened to a computer enclosure, and the storage device defines at least one hole in a sidewall thereof. The bracket comprises a side panel and at least one elastic tab disposed at the side panel corresponding to the hole of the storage device. The elastic tab includes a fixing portion, for engaging in the hole of the storage device, and an operation portion positioned outside the bracket for manipulating the elastic tab.

Other advantages and novel features will become more apparent from the following detailed description when taken in conjunction with the accompanying drawings, in which:

DETAILED DESCRIPTION OF THE EMBODIMENT

Figure 1:
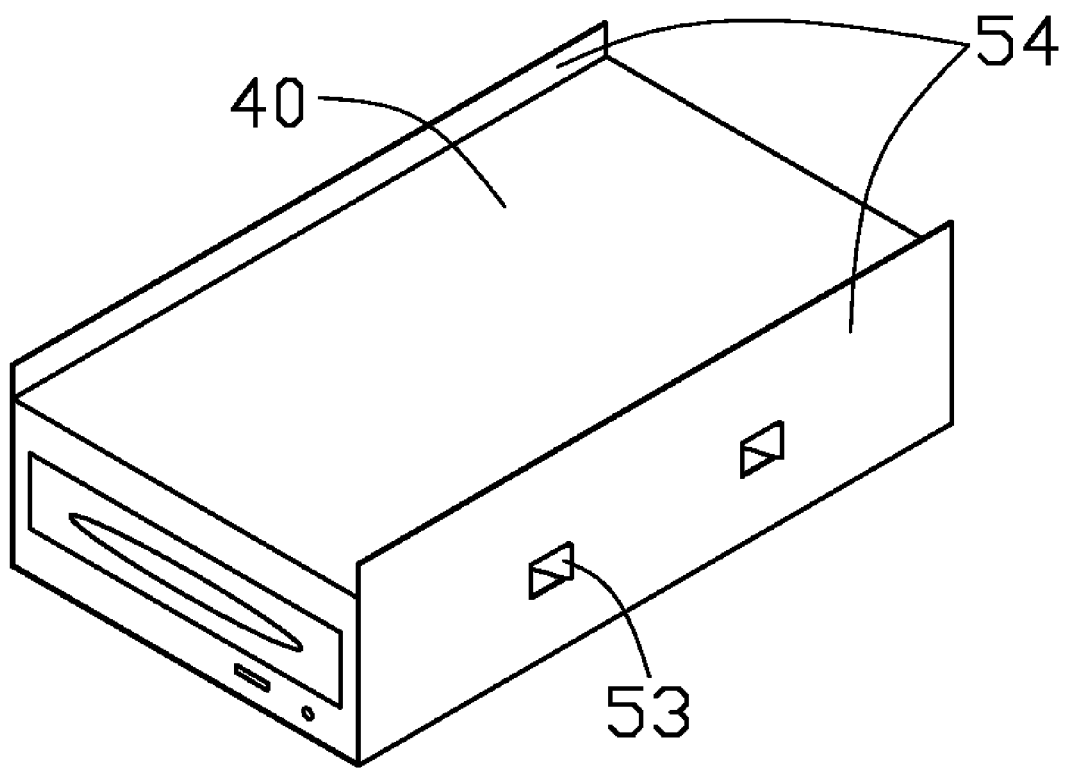
FIG. 1 is an assembled, isometric view of a mounting apparatus in accordance with an embodiment of the present invention together with a storage device.
Figure 2:
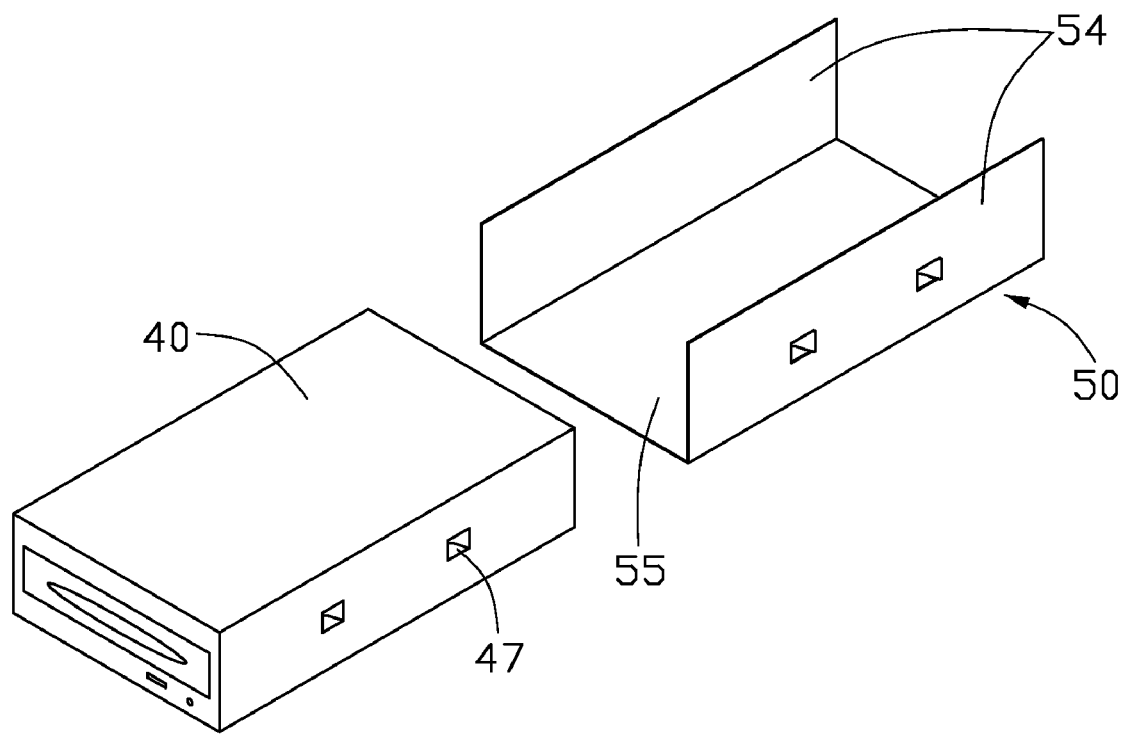
FIG. 2 is an exploded view of FIG. 1.

Referring to FIG. 1 and FIG. 2, a mounting apparatus in accordance with an embodiment of the present invention is provided for holding a data device like a data storage device 40 in place. The storage device includes two holes 47 formed in one sidewall thereof. The mounting apparatus includes a bracket 50 to receive the storage device 40 therein.

Figure 3:
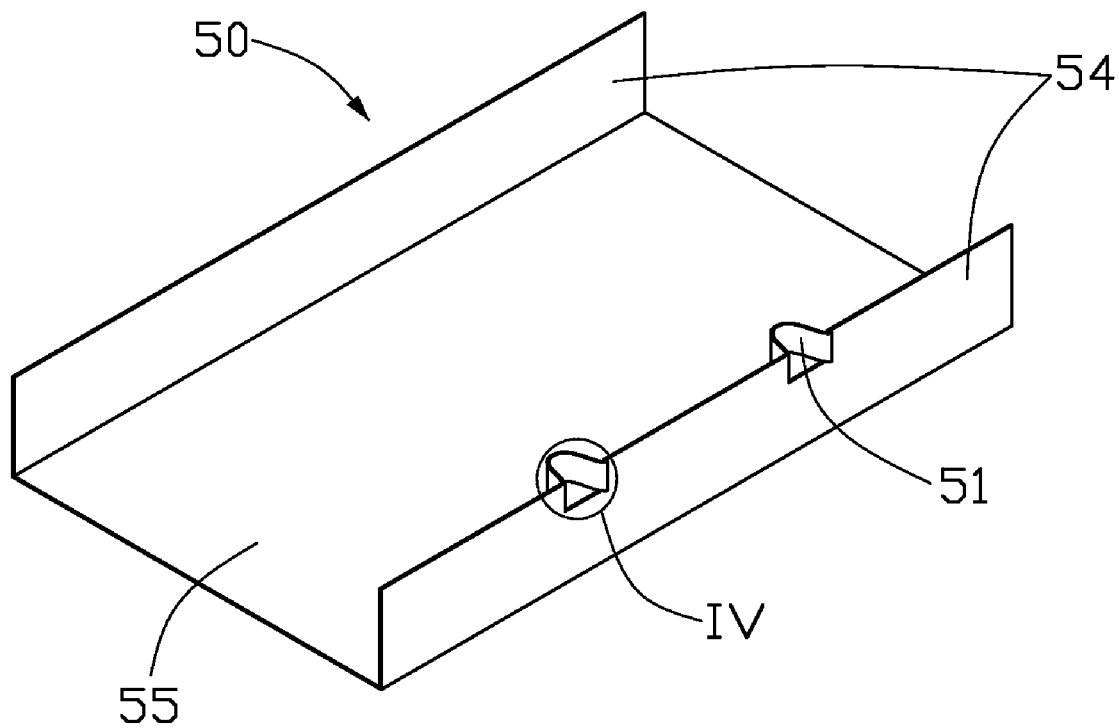
FIG. 3 is a partially sectioned enlarged view of a FIG. 2.
Figure 4:
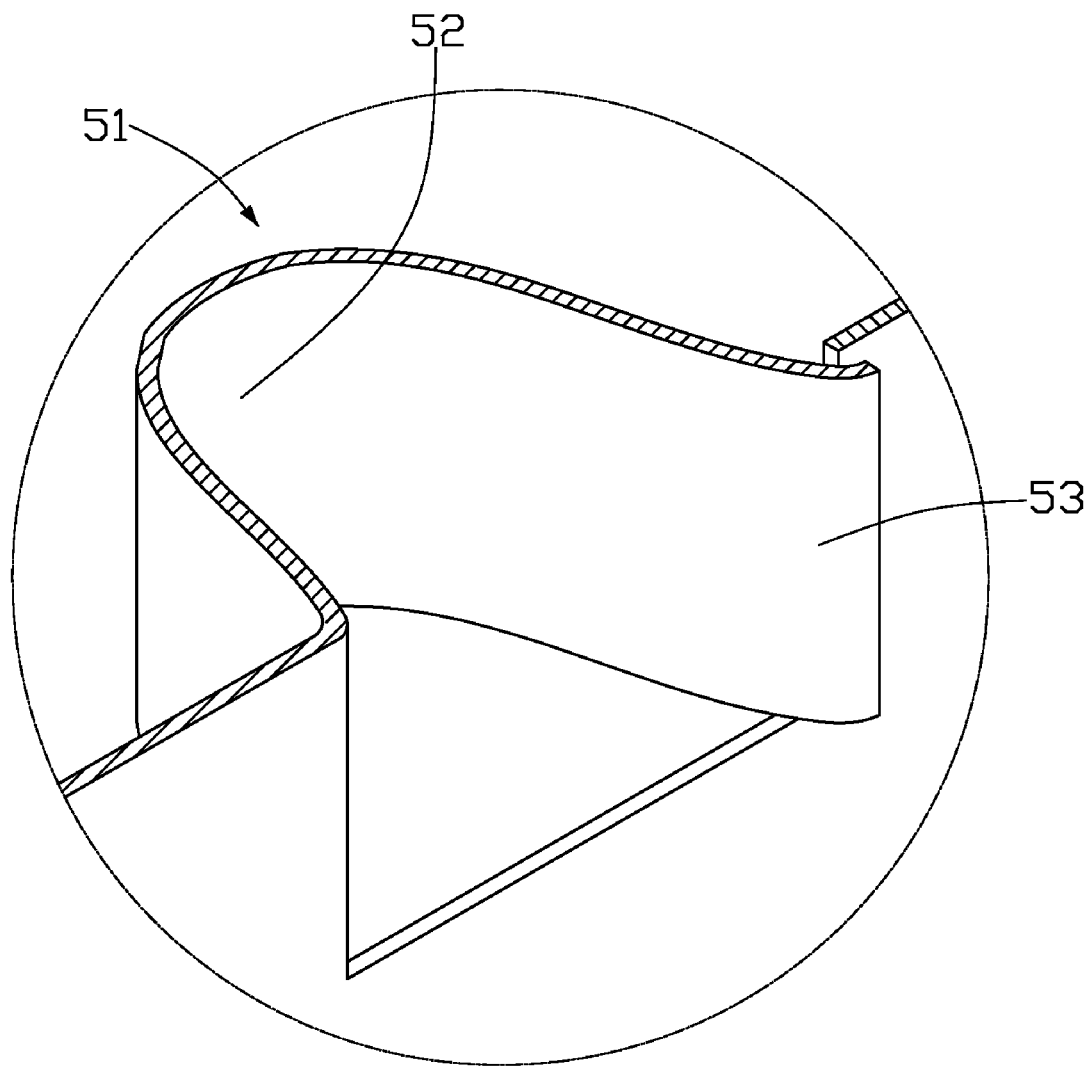
FIG. 4 is an enlarged view of a circled portion IV of FIG. 3.

The bracket 50 may be fastened to a computer enclosure (not shown) by bolts or the like. The bracket 50 includes a bottom plate 55 and a pair of parallel side panels 54 perpendicularly extending from two longitudinal edges of the bottom plate 55 respectively. Referring also to FIG. 3 and FIG. 4, one of the side panels 54 includes a pair of generally U-shaped elastic tabs 51 formed thereon, corresponding to the holes 47 of the storage device. Each elastic tab 51 is bent from the one of the side panel 54 slantedly inward and then slantedly outward to form the generally U shape. Each elastic tab 51 comprises a connecting end integrally connecting with the one of the side panels 54, a fixing portion 52 located in the middle thereof and a free end disconnecting with the one of the side panels 54 and acting as an operating portion 53. The fixing portions 52 are located inside the bracket 50, and the operating portions 53 are disposed generally outside of the bracket 50.

The bracket 50 and the elastic tab 51 are made of any suitable resilient material.

To assemble the storage device 40 to the bracket 50, the storage device 40 is pushed into the bracket 50 in a longitudinal direction along the bottom plate 55 of the bracket 50. When the storage device 40 is moved into the bracket 50, one side of the storage device 40 urges the fixing portion 52 of each tab 51 to flex out, thereby allowing entry of the storage device 40 into the bracket 50. The storage device 40 is pushed in until the holes 47 align with the fixing portions 52, respectively, allowing the elastic tabs 51 rebound thus inserting, the fixing portions 52 into the corresponding holes 47 for fixing the storage device 40 in the bracket 50.

To detach the storage device 40, the operating portions 53 are pulled to flex away from the bracket 50, thus removing the fixing portions 52 of the elastic tabs 51 from the holes 47, and the storage device 40 is pulled to bring the holes 47 out of alignment with the fixing portion 52. Then, the elastic tabs 51 may be released, and the storage device 40 fully removed from the bracket 50.

It is believed that the present embodiment and its advantages will be understood from the foregoing description, and it will be apparent that various changes may be made thereto without departing from the spirit and scope of the invention or sacrificing all of its material advantages, the example hereinbefore described merely being preferred or exemplary embodiment.

What is claimed is:

1. A mounting apparatus assembly comprising:
   a storage device defining at least one hole in a sidewall thereof; and
   a bracket configured to accommodate the storage device, the bracket comprising a side panel corresponding to the sidewall of the storage device; and at least one elastic tab disposed at the side panel corresponding to the hole of the storage device,
   wherein the at least one elastic tab is integrally stamped from the side panel to form at least one opening, the at least one elastic tab comprises a connecting end fixed with an edge of the at least one opening of the side panel, a fixing portion connecting to the connecting end and extending inward from the connecting end configured to engage in the at least one hole of the storage device; and an operation portion connecting to a free end of the fixing portion and positioned outside the bracket for manipulating the elastic tab.

2. The mounting apparatus as claimed in claim 1, wherein the elastic tab is made of resilient material.

3. The mounting apparatus as claimed in claim 1, wherein the bracket is made of resilient material.

4. The mounting apparatus as claimed in claim 1, wherein the elastic tab is generally U-shaped and comprises a free end disconnected with the side panel of the bracket and acting as the operation portion.

5. A mounting apparatus assembly comprising:

a storage device defining at least one hole in a sidewall thereof; and a bracket configured to accommodate the storage device, the bracket comprising a side panel parallel to the sidewall of the storage device, at least one elastic tab disposed at the side panel corresponding to the hole of the storage device, wherein the at least one elastic tab comprises a connecting end fixed with the side panel, a fixing portion extending inward from the connecting end configured to engage in the at least one hole of the storage device to fix the storage device with the bracket, and an operation portion being a free end disconnected with the side panel of the bracket and positioned outside the bracket for manipulating the elastic tab, wherein the storage device is slidably attached to the bracket, and the fixing portion of the at least one elastic tab comprises a slanted section extending from the connecting end such that the storage device, when slid into the bracket, is capable of urging the at least one elastic tab to flux out via pushing the slanted section.

6. The mounting apparatus assembly as claimed in claim 5, wherein the at least one elastic tab is bent from the side panel inward and then outward to form a generally U shape with one free end disconnecting with the side panel and acting as the operation portion.

7. The mounting apparatus assembly as claimed in claim 6, wherein at least one opening is defined at the side panel and aligned with the at least one hole of the storage device, the at least one elastic tab being disposed at the at least one opening.

8. A mounting apparatus assembly comprising: a storage device defining at least one hole in a sidewall thereof; and a bracket configured to accommodate the storage device, the bracket comprising a side panel parallel to the sidewall of the storage device, at least one opening defined in the side panel and aligned with the at least one hole of the storage device, and at least one elastic tab, wherein the at least one elastic tab comprises a connecting end connected to an edge of the at least one opening, a fixing portion connecting to the connecting end and received in the bracket, and an operation portion located outside the bracket; wherein when the storage device is slid into the bracket, the sidewall of the storage device urges the fixing portion of the at least one elastic tab to deform, and then the at least one elastic tab restores to engage in the at least one hole of the storage device.

9. The mounting apparatus assembly as claimed in claim 8, wherein the fixing portion slantedly extends inward and then outward of the bracket to form two slanted portions, one of the slanted portions is urged by the sidewall of the storage device to deform the corresponding elastic tab.

10. The mounting apparatus assembly as claimed in claim 8, wherein a free end of the fixing portion is disconnected with the side panel of the bracket to act as the operation portion.

\* \* \* \* \*